(12) United States Patent
Tamaoki

(10) Patent No.: US 8,577,243 B2
(45) Date of Patent: Nov. 5, 2013

(54) SERIAL COMMUNICATION APPARATUS AND IMAGE FORMING APPARATUS INCLUDING THE SAME

(75) Inventor: Tomohiro Tamaoki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 13/041,110

(22) Filed: Mar. 4, 2011

(65) Prior Publication Data

US 2011/0222896 A1 Sep. 15, 2011

(30) Foreign Application Priority Data

Mar. 9, 2010 (JP) ................................. 2010-052021

(51) Int. Cl.
*G03G 15/00* (2006.01)

(52) U.S. Cl.
USPC .................. 399/88; 399/89; 399/37; 358/474

(58) Field of Classification Search
USPC .................................................. 399/88, 89, 37
See application file for complete search history.

(56) References Cited

U.S. PATENT DOCUMENTS

| | | | |
|---|---|---|---|
| RE33,940 E * | 5/1992 | Matsuo ............................ | 399/14 |
| 5,187,523 A | 2/1993 | Osawa | |
| 5,353,103 A * | 10/1994 | Okamoto et al. ............... | 399/63 |
| 5,995,802 A * | 11/1999 | Mori et al. ..................... | 399/394 |
| 6,525,834 B2 * | 2/2003 | Kurita et al. ................... | 358/1.18 |
| 7,475,270 B1 | 1/2009 | Culler | |
| 2008/0068355 A1 | 3/2008 | Chen | |
| 2008/0170604 A1 | 7/2008 | Komoda | |

FOREIGN PATENT DOCUMENTS

| | | |
|---|---|---|
| CN | 1837971 A | 9/2006 |
| EP | 1104105 A2 | 5/2001 |
| EP | 1510885 A2 | 3/2005 |
| EP | 1705796 A2 | 9/2006 |
| JP | 4-356076 A | 12/1992 |
| JP | 2007-249942 A | 9/2007 |

\* cited by examiner

*Primary Examiner* — Walter L Lindsay, Jr.
*Assistant Examiner* — Roy Y Yi
(74) *Attorney, Agent, or Firm* — Canon U.S.A., Inc. IP Division

(57) ABSTRACT

An image forming apparatus includes a photosensitive member, an exposure unit configured to expose the photosensitive member corresponding to an image, a developing unit configured to develop, using a toner, an electrostatic latent image formed on the exposed photosensitive member, a generation unit configured to generate a waveform signal for the developing unit, a parallel-to-serial conversion unit configured to apply, at a predetermined sampling period, parallel-to-serial conversion to a plurality of signals including the generated waveform signal, a serial-to-parallel conversion unit configured to apply, at the predetermined sampling period, serial-to-parallel conversion to the signals output from the parallel-to-serial conversion unit, and a voltage applying unit configured to apply to the developing unit a voltage composed of a direct-current voltage and an alternating-current voltage superimposed thereon based on the waveform signal among signals output from the serial-to-parallel conversion unit.

6 Claims, 13 Drawing Sheets

FIG.4

| PORT | SIGNAL NAME |
|---|---|
| Pi7(Po7) | CLUTCH ON SIGNAL |
| Pi6(Po6) | MOTOR CURRENT SETTING 1 SIGNAL |
| Pi5(Po5) | MOTOR CURRENT SETTING 0 SIGNAL |
| Pi4(Po4) | MOTOR CLOCK SIGNAL |
| Pi3(Po3) | DEVELOPMENT DC ON SIGNAL |
| Pi2(Po2) | DEVELOPMENT AC ON SIGNAL |
| Pi1(Po1) | DEVELOPMENT AC CLOCK SIGNAL |
| Pi0(Po0) | — |

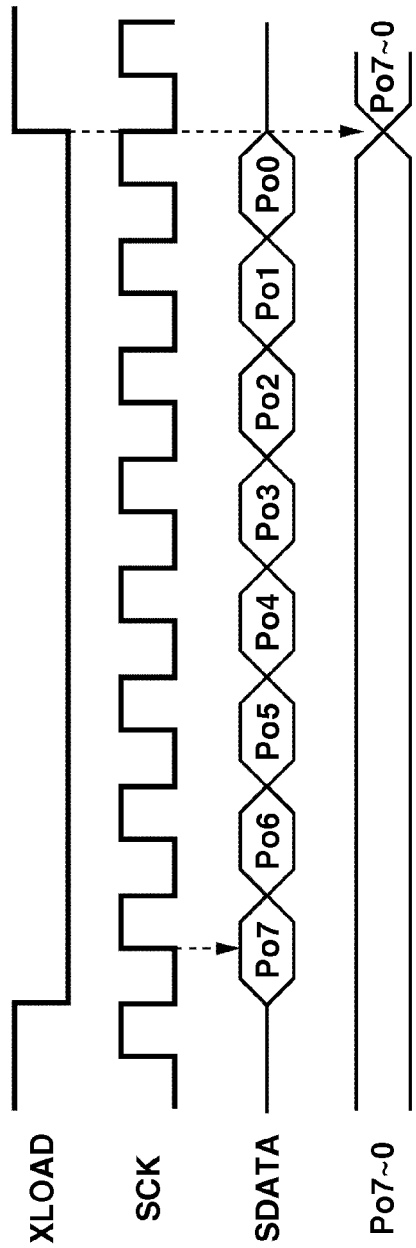

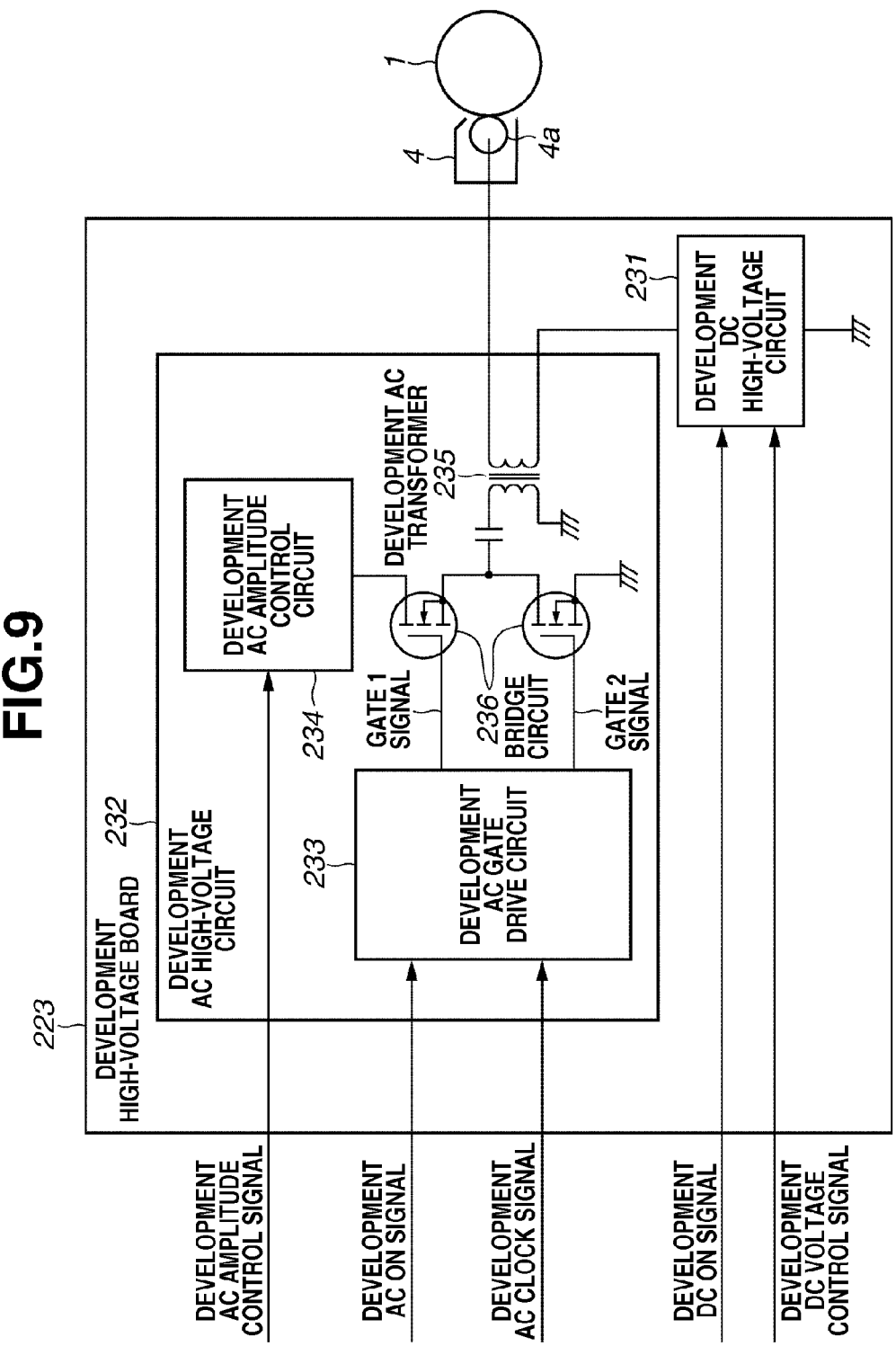

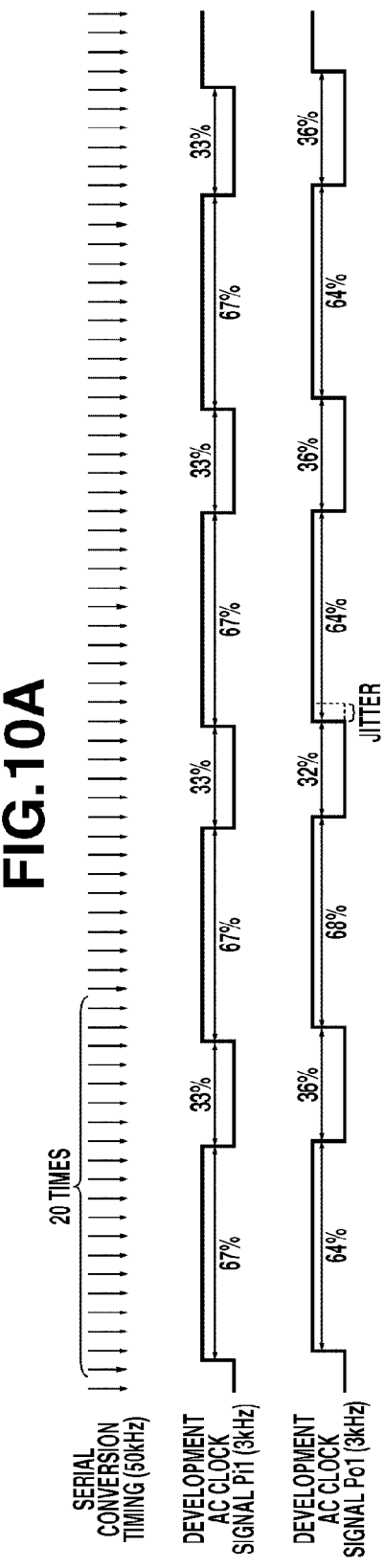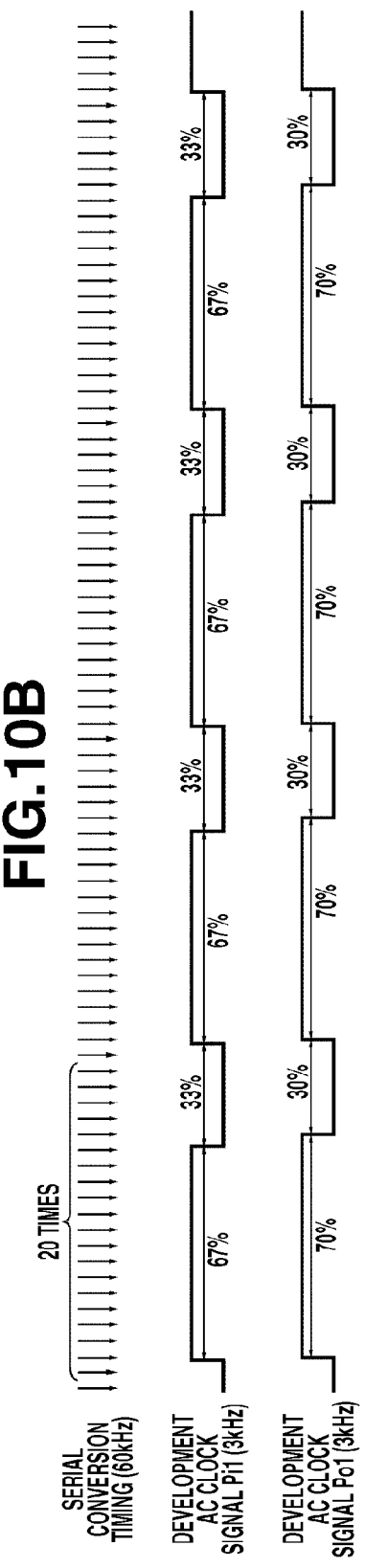

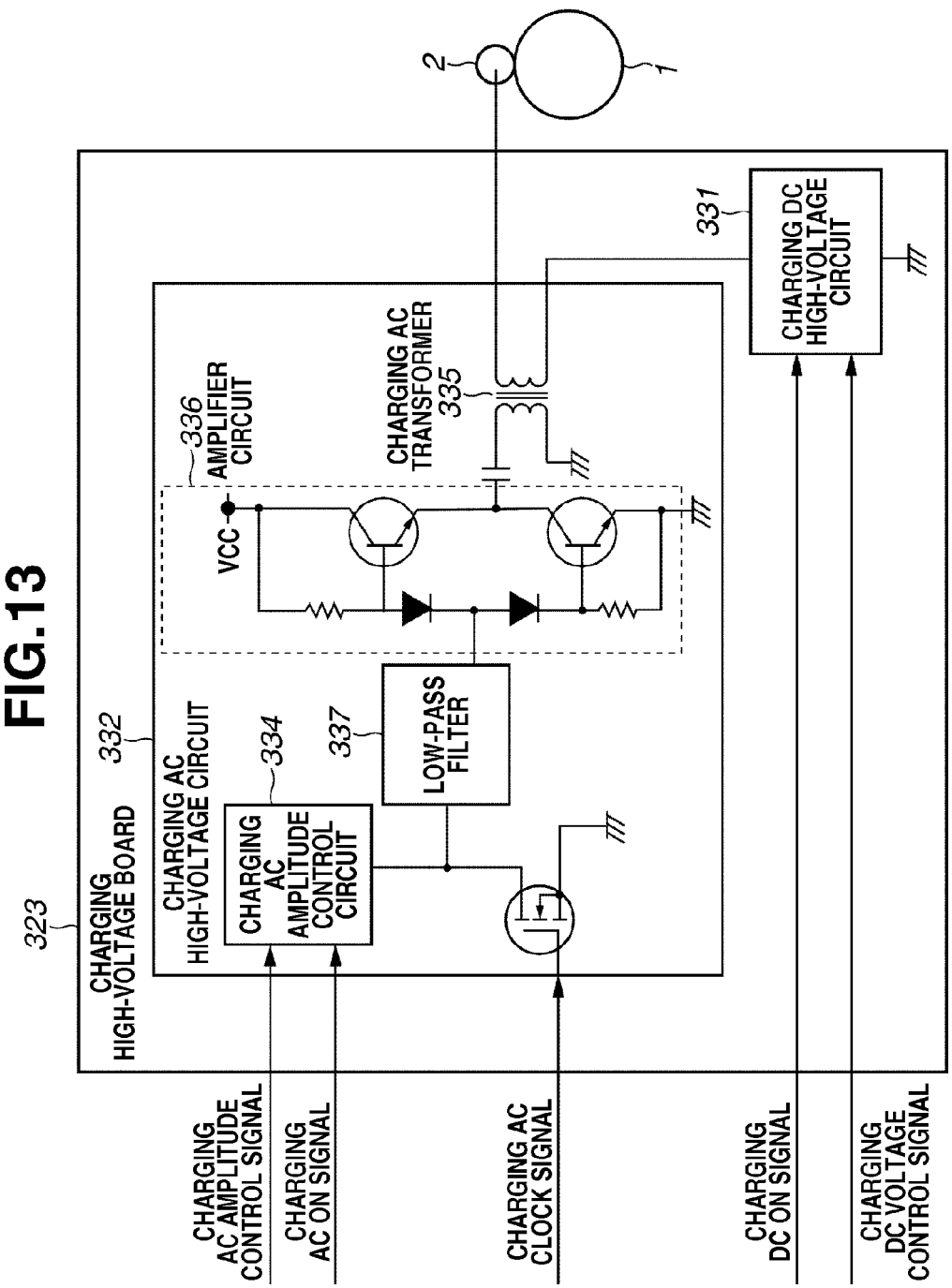

SERIAL COMMUNICATION APPARATUS AND IMAGE FORMING APPARATUS INCLUDING THE SAME

BACKGROUND OF THE INVENTION

1. Field of the Invention

The present invention relates to a serial communication apparatus which performs waveform signal serial communication at a predetermined sampling period and also to an image forming apparatus including the serial communication apparatus.

2. Description of the Related Art

An electrophotographic image forming apparatus is known to use a development method which forms an oscillating electric field between a photosensitive drum and a development sleeve of a developing unit to develop an electrostatic latent image on the photosensitive drum by a toner. The toner sufficiently adheres to image portions on the photosensitive drum by a biasing electric field of an oscillating electric field. The toner adhering to non-image portions on the photosensitive drum is separated therefrom by a back-biasing electric field of the oscillating electric field. To form the oscillating electric field, a development voltage composed of a direct-current (DC) voltage and an alternating-current (AC) voltage superimposed thereon is applied to the development sleeve. Japanese Patent Application Laid-Open No. H4-356076 discusses a technique for controlling the ratio of a biasing electric field to a back-biasing electric field to prevent a toner from remaining on non-image portions on a photosensitive drum.

The ratio of the biasing electric field to the back-biasing electric field can be easily controlled by applying a rectangular wave AC voltage to the development sleeve and controlling a duty ratio of high and low levels of the rectangular wave. More specifically, a main control circuit board generates a development AC clock signal representing a period and a duty ratio of the AC voltage applied to the development sleeve and a development AC amplitude control signal representing the amplitude of the AC voltage applied to the development sleeve. The main control circuit board transmits the development AC clock signal and the development AC amplitude control signal to a development high-voltage board. The development high-voltage board applies to the development sleeve the development voltage composed of a DC voltage and an AC voltage superimposed thereon, the AC voltage corresponding to the development AC clock signal and the development AC amplitude control signal.

The main control circuit board of the image forming apparatus also transmits signals to a driver board which operates motors and clutches in the image forming apparatus. Signal lines for transmitting these signals connect the main control circuit board and the driver board and the main control circuit board and the development high-voltage board. With the increase in precision, an operation speed, and functional diversity of the image forming apparatus, the number of signal lines from the main control circuit board is also increasing. Since each circuit board is implemented apart from the main control circuit board in many cases, connecting the main control circuit board and each circuit board with a number of signal lines will not only make it difficult to downsize the image forming apparatus but also degrade the workability at the time of assembly operation of the image forming apparatus.

SUMMARY OF THE INVENTION

According to an aspect of the present invention, a communication apparatus includes a generation unit configured to generate a waveform signal, and a serial communication unit configured to perform, at a predetermined sampling period, serial communication of the generated waveform signal, wherein a frequency of the predetermined sampling period is an integral multiple of a frequency of the waveform signal.

According to another aspect of the present invention, an image forming apparatus which has a communication apparatus including a generation unit configured to generate a waveform signal, and a serial communication unit configured to perform, at a predetermined sampling period, serial communication of the generated waveform signal, wherein a frequency of the predetermined sampling period is an integral multiple of a frequency of the waveform signal, includes a photosensitive member, an exposure unit configured to expose the photosensitive member corresponding to an image, a developing unit configured to develop, using a toner, an electrostatic latent image formed on the exposed photosensitive member, and a voltage applying unit configured to apply to the developing unit a voltage based on the generated waveform signal.

According to yet another aspect of the present invention, an image forming apparatus which has a serial communication apparatus including a generation unit configured to generate a waveform signal, and a serial communication unit configured to perform, at a predetermined sampling period, serial communication of the generated waveform signal, wherein a frequency of the predetermined sampling period is an integral multiple of a frequency of the waveform signal, includes a photosensitive member, a charging unit configured to charge the photosensitive member, an exposure unit configured to expose the photosensitive member corresponding to an image, a developing unit configured to develop, using a toner, an electrostatic latent image formed on the exposed photosensitive member, and a voltage applying unit configured to apply to the charging unit a voltage based on the generated waveform signal transmitted from the serial communication unit.

According to yet another aspect of the present invention, an image forming apparatus which has a serial communication apparatus including a generation unit configured to generate a waveform signal, a serial communication unit configured to perform, at a predetermined sampling period, serial communication of the generated waveform signal, wherein a frequency of the predetermined sampling period is an integral multiple of a frequency of the waveform signal, and wherein the serial communication unit includes a parallel-to-serial conversion unit configured to apply, at the predetermined sampling period, parallel-to-serial conversion to a plurality of signals including the generated waveform signal, and a serial-to-parallel conversion unit configured to apply, at the predetermined sampling period, serial-to-parallel conversion to the signals output from the parallel-to-serial conversion unit, includes a photosensitive member, an exposure unit configured to expose the photosensitive member corresponding to an image, a developing unit configured to develop, using a toner, an electrostatic latent image formed on the exposed photosensitive member, and a voltage applying unit configured to apply to the developing unit a voltage based on the waveform signal output from the serial-to-parallel conversion unit.

According to yet another aspect of the present invention, an image forming apparatus which has a communication apparatus including a generation unit configured to generate a waveform signal, a serial communication unit configured to perform, at a predetermined sampling period, serial communication of the generated waveform signal, wherein a frequency of the predetermined sampling period is an integral multiple of a frequency of the waveform signal, and wherein the serial communication unit includes a parallel-to-serial conversion unit configured to apply, at the predetermined sampling period, parallel-to-serial conversion to a plurality of signals including the generated waveform signal, and a serial-to-parallel conversion unit configured to apply, at the predetermined sampling period, serial-to-parallel conversion to the signals output from the parallel-to-serial conversion unit, includes a photosensitive member, a charging unit configured to charge the photosensitive member, an exposure unit configured to expose the photosensitive member corresponding to an image, a developing unit configured to develop, using a toner, an electrostatic latent image formed on the exposed photosensitive member, and a voltage applying unit configured to apply to the developing unit a voltage based on the waveform signal output from the serial-to-parallel conversion unit.

According to yet another aspect of the present invention, an image forming apparatus includes a photosensitive member, an exposure unit configured to expose the photosensitive member corresponding to an image, a developing unit configured to develop, using a toner, an electrostatic latent image formed on the exposed photosensitive member, a generation unit configured to generate a waveform signal for the developing unit, a parallel-to-serial conversion unit configured to apply, at a predetermined sampling period, parallel-to-serial conversion to a plurality of signals including the generated waveform signal, a serial-to-parallel conversion unit configured to apply, at the predetermined sampling period, serial-to-parallel conversion to the signal output from the parallel-to-serial conversion unit, and a voltage applying unit configured to apply to the developing unit a voltage based on the waveform signal output from the serial-to-parallel conversion unit.

According to yet another aspect of the present invention, an image forming apparatus includes a photosensitive member, a charging unit configured to charge the photosensitive member, an exposure unit configured to expose the photosensitive member corresponding to an image, a developing unit configured to develop, using a toner, an electrostatic latent image formed on the exposed photosensitive member, a generation unit configured to generate a waveform signal for the charging unit, a parallel-to-serial conversion unit configured to apply, at a predetermined sampling period, parallel-to-serial conversion to a plurality of signals including the generated waveform signal, a serial-to-parallel conversion unit configured to apply, at the predetermined sampling period, serial-to-parallel conversion to the signal output from the parallel-to-serial conversion unit, and a voltage applying unit configured to apply to the developing unit a voltage based on the waveform signal output from the serial-to-parallel conversion unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates signals assigned to input ports of a parallel-to-serial conversion circuit and output ports of a serial-to-parallel conversion circuit.

FIG. 8 is a timing chart illustrating input and output signals for the serial-to-parallel conversion circuit.

FIG. 9 is a circuit diagram of a development high-voltage board.

FIGS. 10A and 10B are timing charts illustrating a relation between the development AC clock signal input to the parallel-to-serial conversion circuit and the development AC clock signal output from the serial-to-parallel conversion circuit.

FIG. 13 is a circuit diagram of the charging high-voltage board.

DESCRIPTION OF THE EMBODIMENTS

Various exemplary embodiments, features, and aspects of the invention will be described in detail below with reference to the drawings.

Figure 1:
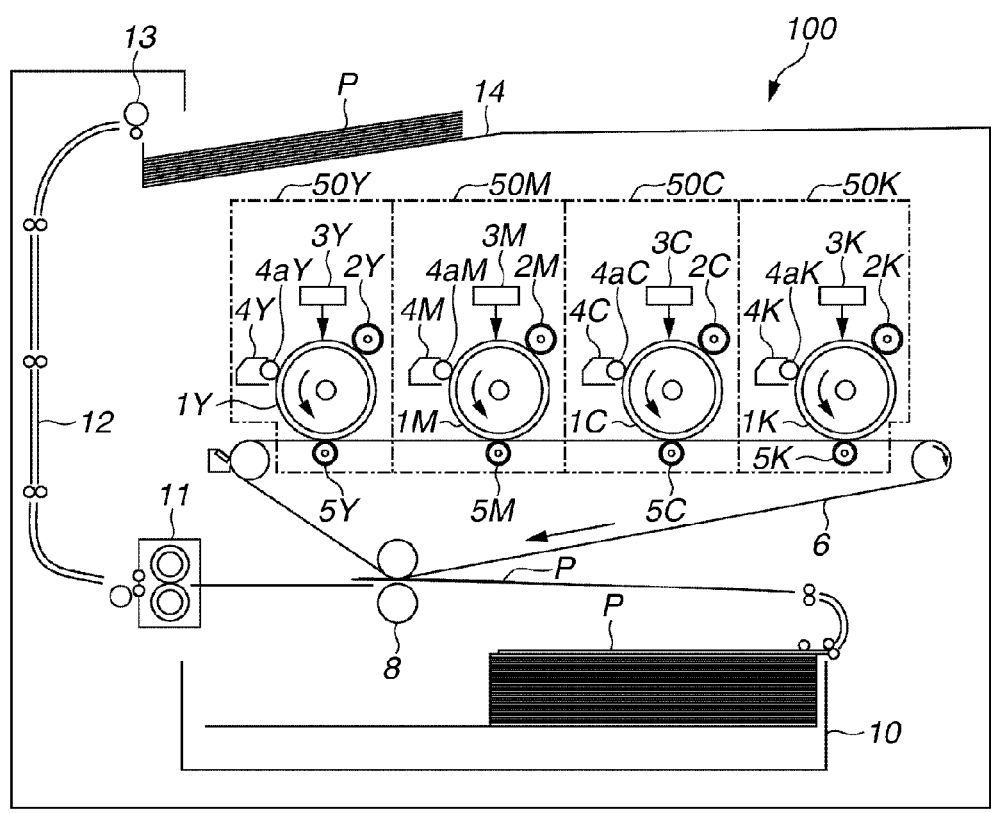
FIG. 1 is a sectional view of an image forming apparatus according to a first exemplary embodiment of the present invention.

FIG. 1 is a sectional view of an image forming apparatus 100 according to a first exemplary embodiment of the present invention. The image forming apparatus 100 is an electrophotographic image forming apparatus which forms a color image using toner of four colors, namely yellow (Y), magenta (M), cyan (C), and black (K) toners. The image forming apparatus 100 includes image forming units 50Y, 50M, 50C, and 50K for forming toner images of respective colors. The image forming units 50Y, 50M, 50C, and 50K form yellow (Y), magenta (M), cyan (C), and black (K) toner images, respectively, based on respective image signals. The image forming units 50Y, 50M, 50C, and 50K include photosensitive drums 1Y, 1M, 1C, and 1K (photosensitive members), charging rollers 2Y, 2M, 2C, and 2K, laser exposure units 3Y, 3M, 3C, and 3K, developing units 4Y, 4M, 4C, and 4K, and primary transfer rollers 5Y, 5M, 5C, and 5K, respectively. The image forming units 50Y, 50M, 50C, and 50K each have the similar configuration and functions, so that in the following descriptions, subscripts Y, M, C, and K are omitted.

The charging roller 2 is provided in contact with the photosensitive drum 1, and driven and rotated by the rotation of the photosensitive drum 1. A DC voltage (for example, a predetermined DC voltage −1000 to −1500 VDC) is applied to the charging roller 2 as a charging voltage. A surface of the photosensitive drum 1 is uniformly charged to a predetermined (negative) potential by the charging roller 2. The charging voltage may be applied to the photosensitive drum 1 by a charging member other than the charging roller 2. Further, as long as electric discharge for applying the charging voltage is performed between the charging member and the photosensitive drum 1, a micro gap (for example, about 10 micrometers) may be provided between the charging member and the photosensitive drum 1.

The laser exposure unit 3 modulates laser light based on an image signal. The laser light modulated by the laser exposure unit 3 is deflected in a main scanning direction, and then applied onto the rotating photosensitive drum 1 (photosensitive member). Performing the exposure process corresponding to an image in this way forms an electrostatic latent image on the photosensitive drum 1.

The developing unit 4 supplies the toner to the photosensitive drum 1 via a rotating development sleeve 4a. The development voltage composed of a predetermined DC voltage −150 to −700 VDC and a predetermined AC voltage 1000 to 2000 VAC superimposed thereon is applied to the development sleeve 4a. Thus, negatively charged toner is supplied to the photosensitive drum 1, and the electrostatic latent image formed on the photosensitive drum 1 is developed by the toner.

The primary transfer roller 5 is driven and rotated by the movement of an intermediate transfer belt 6. A DC voltage having a potential (positive potential) opposite to the potential of the toner is applied to the primary transfer roller 5 as a primary transfer voltage. Thus, the toner image formed on the photosensitive drum 1 is transferred onto the intermediate transfer belt 6.

Toner images of respective colors formed by the four image forming units 50Y to 50K are superimposed one another and transferred onto the intermediate transfer belt 6 (primary transfer process). Thus, a full color toner image is formed and borne on the intermediate transfer belt 6. The full color toner image borne on the intermediate transfer belt 6 is transferred by a secondary transfer roller 8 onto a sheet P which is fed from a sheet cassette 10 and conveyed into a gap between the secondary transfer roller 8 and the intermediate transfer belt 6 (secondary transfer process). A predetermined DC voltage +500 to +7000 VDC is applied to the secondary transfer roller 8.

The sheet P having the full color toner image transferred thereon is conveyed to a fixing device 11. The fixing device 11 applies heat and pressure to the sheet P to fix the toner image thereon. The sheet P having the toner image fixed thereon passes through a conveyance path 12 and a delivery roller 13, and then is discharged onto a discharge tray 14.

Figure 2:
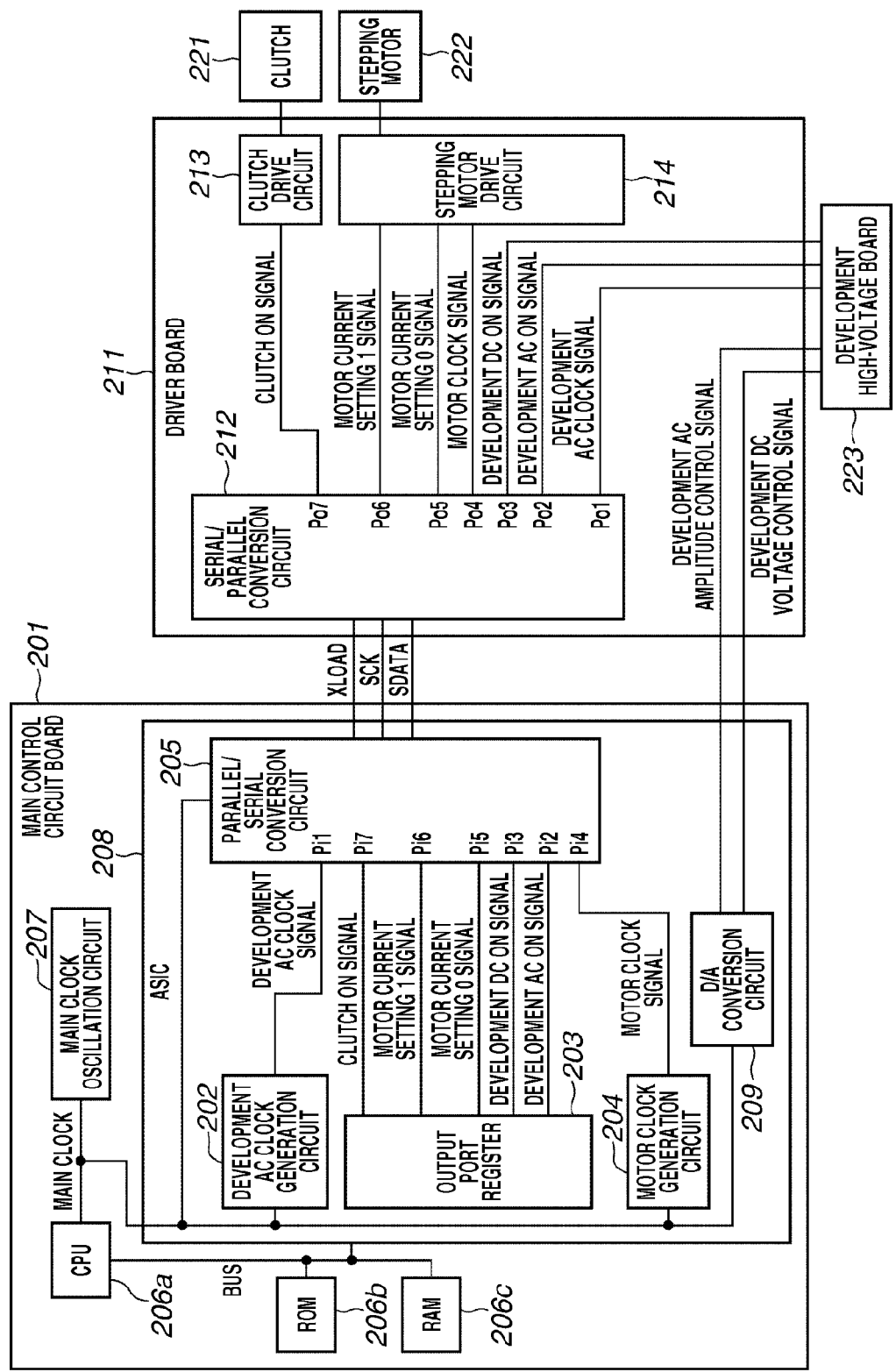
FIG. 2 is a block diagram of a main control circuit board and a driver board according to the first exemplary embodiment.

FIG. 2 is a block diagram of a main control circuit board 201 of the image forming apparatus 100 and a driver board 211 of the image forming unit 50. Although the driver board 211 is provided in each of the four image forming units 50Y to 50K, FIG. 2 illustrates only one driver board 211 to simplify descriptions.

The driver board 211 is connected with a development high-voltage board 223 which applies an AC voltage to the development sleeve 4a in the image forming unit 50. The driver board 211 includes a clutch drive circuit 213 for driving a clutch 221 and a stepping motor drive circuit 214 for driving a stepping motor 222. The stepping motor 222 drives and rotates the development sleeve 4a in each of the four image forming units 50Y to 50K. The clutch 221 connects and disconnects a driving force transfer system between the stepping motor 222 and the development sleeve 4a.

The main control circuit board 201 includes a central processing unit (CPU) 206a, a read-only memory (ROM) 206b, a random access memory (RAM) 206c, and an application specific integrated circuit (ASIC) 208. The CPU 206a controls the image forming apparatus 100 according to a program stored in the ROM 206b while using the RAM 206c as a work area. The CPU 206a, the ROM 206b, the RAM 206c, and the ASIC 208 are connected via a bus.

The main control circuit board 201 outputs signals for controlling the development high-voltage board 223 which applies the development voltage to the developing unit 4. The signals for controlling the development high-voltage board 223 include a development DC ON signal, a development DC voltage control signal, a development AC ON signal, a development AC amplitude control signal, and a development AC clock signal (waveform signals for the developing unit 4). These signals are supplied to the development high-voltage board 223 via the driver board 211.

A main clock oscillation circuit 207 generates a 12 MHz main clock signal (also referred to as reference clock signal), and supplies the main clock signal to the CPU 206a and the ASIC 208. The ASIC 208 includes a development AC clock generation circuit 202, an output port register 203, a motor clock generation circuit 204, a parallel-to-serial conversion circuit 205, and a digital-to-analog (D/A) conversion circuit 209. The development AC clock generation circuit 202, the motor clock generation circuit 204, the parallel-to-serial conversion circuit 205, and the D/A conversion circuit 209 operate in synchronization with the main clock signal. Each of these circuits included in the ASIC 208 has a register used by the CPU 206a to set up respective operation.

Figure 3:
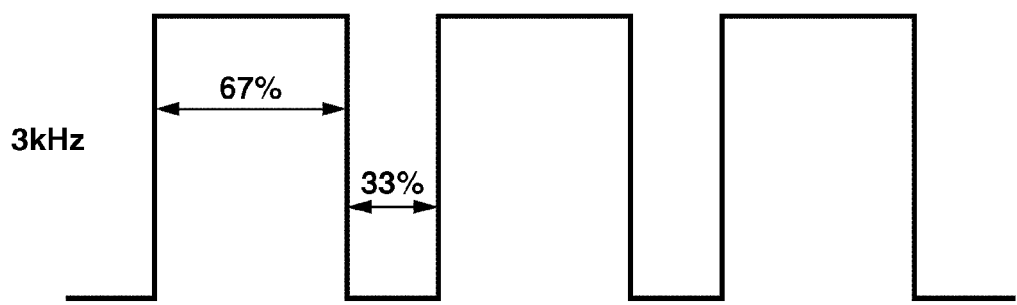
FIG. 3 illustrates a development AC clock signal.

The development AC clock generation circuit 202 divides the main clock signal, which is output from the main clock oscillation circuit 207, to generate the development AC clock signal according to a frequency and a duty ratio of the AC voltage applied to the developing unit 4 set up by the CPU 206a. The development AC clock signal is a rectangular wave clock signal as illustrated in FIG. 3. In the present exemplary embodiment, the development AC clock signal has a frequency of 3 kHz and a duty ratio having 67% high-level width and 33% low-level width.

The D/A conversion circuit 209 converts the development DC voltage control signal and the development AC amplitude control signal, which are digital signals, set by the CPU 206a into analog signals, and supplies the analog signals to the development high-voltage board 223 via the driver board 211.

The output port register 203 controls various output ports according to a setting by the CPU 206a. The output port register 203 outputs the development DC ON signal, the development AC ON signal, a clutch ON signal, and motor current setting signals (a motor current setting 1 signal and a motor current setting 0 signal).

The development DC ON signal and the development AC ON signal is used as an instruction to turn ON the output of the development AC voltage and the development DC voltage. The clutch ON signal is used as an instruction to turn ON the clutch 221. The motor current setting 1 signal and the motor current setting 0 signal set a drive current for the stepping motor 222. The motor clock generation circuit 204 divides the main clock signal which is output from the main clock oscillation circuit 207 to generate a clock signal for driving the stepping motor 222. The stepping motor 222 rotates at a speed according to the set drive current and the generated clock signal.

The parallel-to-serial conversion circuit 205 applies parallel-to-serial conversion to the signals input in parallel from the development AC clock generation circuit 202, the output port register 203, and the motor clock generation circuit 204 into serial form, and then transfers the converted signals to a serial-to-parallel conversion circuit 212 of the driver board 211. The parallel-to-serial conversion circuit 205 samples parallel signals at a predetermined period to convert them into serial signals. The serial-to-parallel conversion circuit 212 converts the serial signals transferred from the parallel-to-serial conversion circuit 205 into parallel signals.

The main control circuit board 201 applies parallel-to-serial conversion to a plurality of signals into serial form and then serially transmits the signals to the driver board 211 in this way, thus the number of the signal lines between the main control circuit board 201 and the driver board 211 can be reduced. This configuration not only contributes to downsizing of the image forming apparatus but also improves workability at the time of assembly operations of the image forming apparatus. This configuration is effective particularly for an image forming apparatus in which the main control circuit board 201, the driver board 211, and the development high-voltage board 223 are disposed separately.

The parallel-to-serial conversion circuit 205 samples parallel signals at a frequency which is an integral multiple of the frequency of the development AC clock signal and converts the parallel signals into serial signals. In the present exemplary embodiment, the parallel-to-serial conversion circuit 205 samples the parallel signals at a frequency of 60 kHz which is 20 times the 3 kHz frequency of the development AC clock signal.

The parallel-to-serial conversion circuit 205 performs parallel-to-serial conversion in synchronization with the main clock signal input from the main clock oscillation circuit 207. The parallel-to-serial conversion circuit 205 transmits a sampling signal XLOAD, a transfer clock signal SCK, and data SDATA to the serial-to-parallel conversion circuit 212.

The sampling signal XLOAD is used to determine the timing of parallel-to-serial conversion and serial-to-parallel conversion. The transfer clock signal SCK is used to achieve synchronization in transferring parallel-to-serial-converted signals (serial signals) to the serial-to-parallel conversion circuit 212.

The serial-to-parallel conversion circuit 212 receives the sampling signal XLOAD, the transfer clock signal SCK, and the data SDATA, and converts the data SDATA (serial signals) into parallel signals in synchronization with the transfer clock signal SCK.

FIG. 4 illustrates signals assigned to input ports of the parallel-to-serial conversion circuit 205 and output ports of the serial-to-parallel conversion circuit 212. Input ports Pi7 to Pi1 of the parallel-to-serial conversion circuit 205 are assigned the clutch ON signal, the motor current setting 1 signal, the motor current setting 0 signal, the motor clock signal, the development DC ON signal, the development AC ON signal, and the development AC clock signal, respectively. These signals are connected to respective ports to be input from each circuit.

Output ports Po7 to Po1 of the serial-to-parallel conversion circuit 212 are assigned the clutch ON signal, the motor current setting 1 signal, the motor current setting 0 signal, the motor clock signal, the development DC ON signal, the development AC ON signal, and the development AC clock signal, respectively. These signals are connected to respective ports to be output to each circuit.

In response to the clutch ON signal input from the output port Po7, the clutch drive circuit 213 turns ON the clutch 221. The stepping motor drive circuit 214 supplies to the stepping motor 222 a drive current corresponding to the motor current setting 1 signal and the motor current setting 0 signal input from the output ports Po6 and Po5, respectively. Further, the stepping motor drive circuit 214 supplies the stepping motor 222 with the motor clock signal input from the output port Po4.

During a period responding to the development DC ON signal input from the output port Po3, the development high-voltage board 223 supplies the developing unit 4 with a DC voltage having a value specified by the development DC voltage control signal input from the D/A conversion circuit 209. During a period responding to the development AC ON signal input from the output port Po2, the development high-voltage board 223 supplies the developing unit 4 with an AC voltage having an amplitude specified by the development AC amplitude control signal input from the D/A conversion circuit 209. The development high-voltage board 223 supplies the developing unit 4 with a voltage composed of a DC voltage and an AC voltage superimposed thereon when both the development DC ON signal and the development AC ON signal are ON. The development high-voltage board 223 supplies the developing unit 4 with a rectangular wave AC voltage having a period and duty ratio specified by the development AC clock signal input from the output port Po1.

Figure 5:
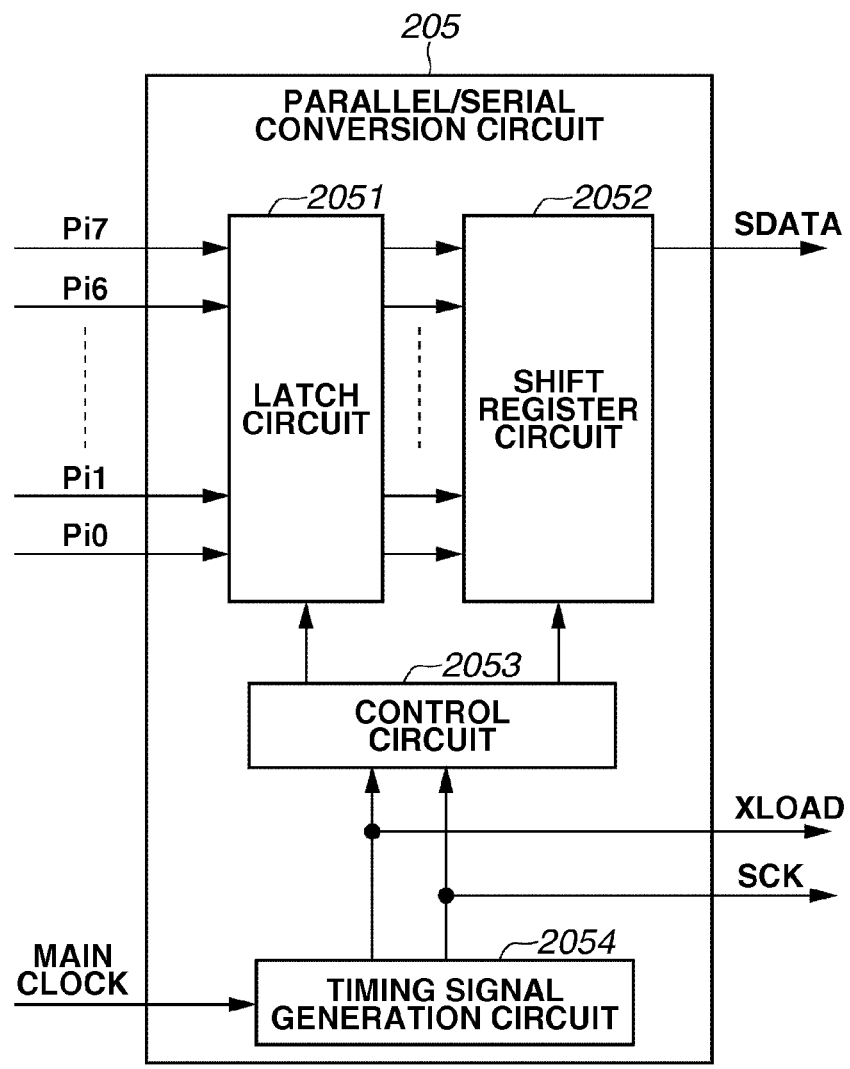
FIG. 5 is a block diagram of the parallel-to-serial conversion circuit.
Figure 6:
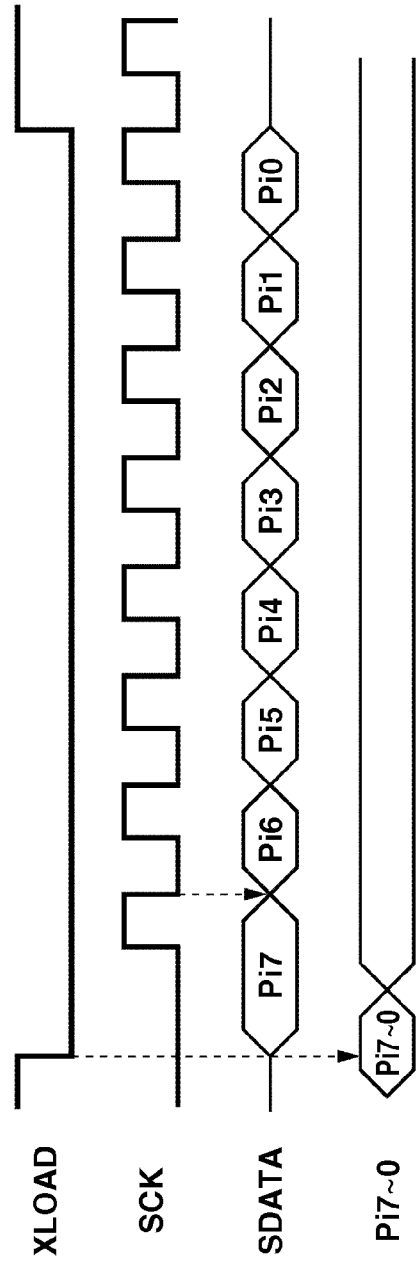
FIG. 6 is a timing chart illustrating input and output signals for the parallel-to-serial conversion circuit.

FIG. 5 is a block diagram of the parallel-to-serial conversion circuit 205. FIG. 6 is a timing chart illustrating input and output signals for the parallel-to-serial conversion circuit 205. The parallel-to-serial conversion circuit 205 includes a latch circuit 2051, a shift register circuit 2052, a control circuit 2053, and a timing signal generation circuit 2054. The timing signal generation circuit 2054 generates a 1.2 MHz SCK signal formed by dividing the main clock signal into one-tenth, and a sampling signal XLOAD for determining the timing of parallel-to-serial conversion and serial-to-parallel conversion.

As illustrated in FIG. 6, a falling edge of the sampling signal XLOAD specifies a sampling timing for parallel-to-serial conversion. The timing signal generation circuit 2054 outputs the sampling signal XLOAD at a period of 60 kHz. Parallel signals Pi7 to Pi0 are input to the latch circuit 2051.

The control circuit 2053 outputs a latch signal to the latch circuit 2051 on the falling edge of the sampling signal XLOAD. In response to the latch signal, the latch circuit 2051 latches (retains) the input signals Pi7 to Pi0, and outputs the latched input signals Pi7 to Pi0 to the shift register circuit 2052. During a period in which the sampling signal XLOAD is set to the low level, the control circuit 2053 outputs a shift signal to the shift register circuit 2052 on the falling edge of the transfer clock signal SCK.

In response to the shift signal, the shift register circuit 2052 sequentially selects the input signals Pi7 to Pi0 and outputs each signal as the data SDATA, in order of Pi7, Pi6, . . . , Pi0. Thus, the parallel-to-serial conversion circuit 205 sequentially transmits the plurality of signals Pi7 to Pi0 to the serial-to-parallel conversion circuit 212 in synchronization with the transfer clock signal SCK. Although the parallel-to-serial conversion circuit 205 latches the plurality of signals on the falling edge of the sampling signal XLOAD, it may latch the signals on a rising edge of the sampling signal XLOAD.

Figure 7:
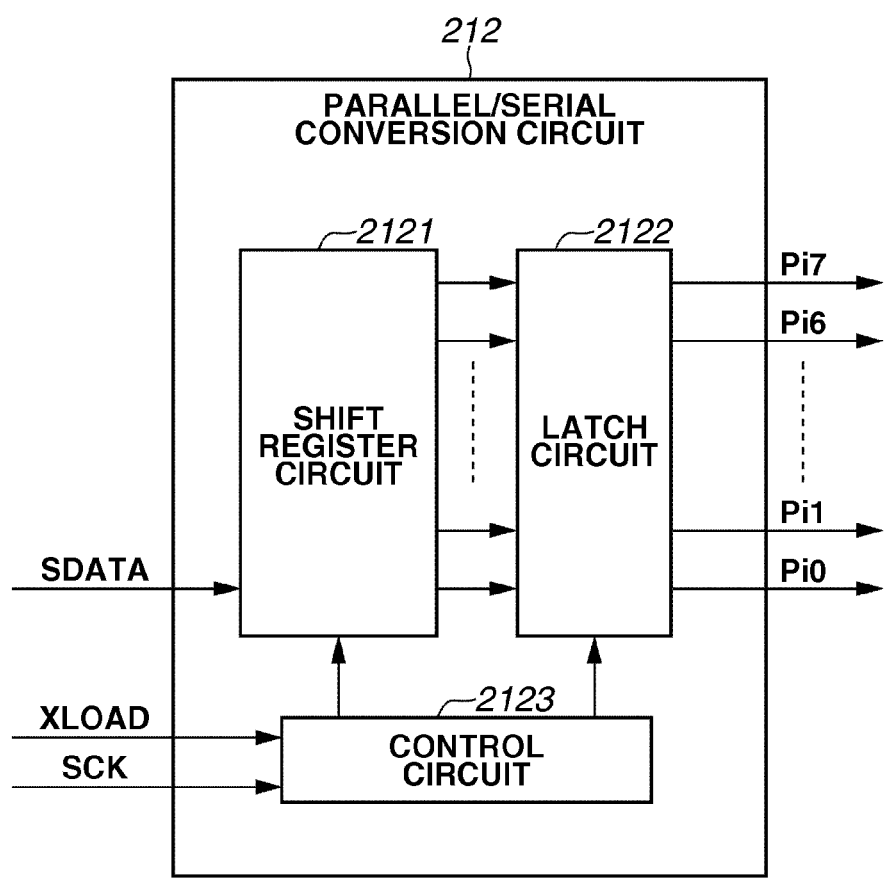
FIG. 7 is a block diagram of the serial-to-parallel conversion circuit.

FIG. 7 is a block diagram of the serial-to-parallel conversion circuit 212. FIG. 8 is a timing chart illustrating input and output signals for the serial-to-parallel conversion circuit 212. The serial-to-parallel conversion circuit 212 includes a shift register circuit 2121, a latch circuit 2122, and a control circuit 2123. During a period in which the sampling signal XLOAD is set to the low level, the control circuit 2123 outputs the shift signal to the shift register circuit 2121 on each rising edge of the transfer clock signal SCK.

In response to the shift signal, the shift register circuit 2121 captures the signals Pi7, Pi6, . . . , Pi0 sequentially input from the data SDATA as signals Po7, Po6, . . . , Po0. Thus, the serial-to-parallel conversion circuit 212 sequentially receives the plurality of signals Pi7 to Pi0 from the parallel-to-serial conversion circuit 205 in synchronization with the transfer clock signal SCK. The sampling signal XLOAD is controlled so as to be set to the high level when the shift register circuit 2121 has captured all of the signals Po7 to Po0.

The control circuit 2123 outputs a latch signal to the latch circuit 2122 on the rising edge of the sampling signal XLOAD. In response to the latch signal, the latch circuit 2122 latches the signals Po7 to Po0 retained by the shift register circuit 2121. The signals latched by the latch circuit 2122 serve as output signals of the output ports Po7 to Po0 of the serial-to-parallel conversion circuit 212.

Although the serial-to-parallel conversion circuit 212 latches a plurality of signals on the rising edge of the sampling signal XLOAD, the serial-to-parallel conversion circuit 212 may latch the signals on the falling edge of the sampling signal XLOAD. In this case, the parallel-to-serial conversion circuit 205 responds to the rising edge of the sampling signal XLOAD.

FIG. 9 is a circuit diagram of the development high-voltage board 223. The D/A conversion circuit 209 on the main control circuit board 201 generates the development AC amplitude control signal and the development DC voltage control signal. The generated development AC amplitude control signal and development DC voltage control signal are input to the development high-voltage board 223. The output port register 203 generates the development AC ON signal and the development DC ON signal. The generated development AC ON signal and development DC ON signal are input to the development high-voltage board 223 via the parallel-to-serial conversion circuit 205 and the serial-to-parallel conversion circuit 212. The development AC clock generation circuit 202 generates the development AC clock signal. The generated development AC clock signal is input to the development high-voltage board 223 via the parallel-to-serial conversion circuit 205 and the serial-to-parallel conversion circuit 212.

The development high-voltage board 223 includes a development DC high-voltage circuit 231 and a development AC high-voltage circuit 232. To the development DC high-voltage circuit 231, the development DC ON signal for turning ON its output and the development DC voltage control signal for setting its output voltage are input. The development AC high-voltage circuit 232 includes a development AC amplitude control circuit 234 and a development AC gate drive circuit 233.

The development AC amplitude control circuit 234 applies a voltage corresponding to the development AC amplitude control signal to a bridge circuit 236 for driving the primary side of a development AC transformer 235, thus controlling the amplitude of the development AC high-voltage circuit 232. The development AC ON signal and the development AC clock signal are input to the development AC gate drive circuit 233.

The development AC gate drive circuit 233 turns ON a gate 1 signal and turns OFF a gate 2 signal when both the development AC ON signal and the development AC clock signal are set to the high level. Further, the development AC gate drive circuit 233 turns OFF the gate 1 signal and turns ON the gate 2 signal when the development AC ON signal is set to the high level and the development AC clock signal is set to the low level. The development AC gate drive circuit 233 turns OFF both the gate 1 signal and the gate 2 signal while the development AC ON signal is set to the low level.

FIGS. 10A and 10B are timing charts illustrating a relation between a development AC clock signal Pi1 input to the parallel-to-serial conversion circuit 205 and a development AC clock signal Po1 output from the serial-to-parallel conversion circuit 212. The parallel-to-serial conversion circuit 205 converts the parallel signals Pi7 to Pi0 including the development AC clock signal Pi1 into serial signals at serial conversion timing of a predetermined frequency.

The frequency of serial conversion timing is set to be an integral multiple of the frequency of the development AC clock signal. In the present exemplary embodiment, the sampling period of the parallel-to-serial conversion circuit 205 is set to 60 kHz which is 20 times the 3 kHz frequency of the development AC clock signal. The reason why the frequency of serial conversion timing is set to be an integral multiple of the frequency of the development AC clock signal will be described below with reference to FIGS. 10A and 10B.

FIG. 10A is a timing chart illustrating an example of defect which occurs when the frequency of serial conversion timing is not an integral multiple of the frequency of the development AC clock signal. In the example in FIG. 10A, the frequency of the development AC clock signal is 3 kHz and the frequency of serial conversion timing is 50 kHz. As described above, the parallel-to-serial conversion circuit 205 samples parallel signals on the falling edge of the sampling signal XLOAD, and the serial-to-parallel conversion circuit 212 outputs parallel signals on the rising edge of the sampling signal XLOAD.

Referring to FIG. 10A, serial conversion timing corresponds to the falling edge of the sampling signal XLOAD. As illustrated in FIG. 10A, although the development AC clock signal Pi1 does not synchronize with the serial conversion timing, the development AC clock signal Pot that has undergone serial conversion synchronizes with the serial conversion timing. Accordingly, the duty ratio of the development AC clock signal having 67% high-level width and 33% low-level width slightly changes to a duty ratio having 64% high-level width and 36% low-level width. However, this change causes no problem since the contrast between charging potential and development potential is controlled by the image forming unit 50.

In the example in FIG. 10A, a problem is that time variation in the duty ratio of the development AC clock signal Po1 changes the development density in the developing unit 4. Referring to FIG. 10A, although, in most of the time, the duty ratio of the development AC clock signal Po1 has 64% high-level width and 36% low-level width, jitter periodically occurs resulting in a duty ratio having 68% high-level width and 32% low-level width.

When the period of the jitter is visible, a periodic band-like image density unevenness (banding) occurs in the rotational direction of the photosensitive drum 1, resulting in degraded image quality. For example, when a process speed of the image forming unit 50 is 400 mm/s, an image density unevenness occurs at 1 mm pitch at a jitter frequency is 400 Hz or at 0.4 mm pitch at a jitter frequency of 1 kHz.

In order to prevent the jitter causing such an image density unevenness, in the present exemplary embodiment, the frequency of serial conversion timing of the parallel-to-serial conversion circuit 205 is set to be an integral multiple of the frequency of the development AC clock signal. FIG. 10B is a timing chart illustrating a preferable example in which the frequency of serial conversion timing is set to be an integral multiple of the frequency of the development AC clock signal. In the example in FIG. 10B, the frequency of the development AC clock signal is 3 kHz and the frequency of serial conversion timing is 60 kHz.

As illustrated in FIG. 10B, although the development AC clock signal Pi1 does not synchronize with the serial conversion timing, the development AC clock signal Po1 that has undergone serial conversion synchronizes with the serial conversion timing. Accordingly, the duty ratio of the development AC clock signal having 67% high-level width and 33% low-level width slightly changes to a duty ratio having 70% high-level width and 30% low-level width. However, this change causes no problem since the contrast between charging potential and development potential is controlled by the image forming unit 50.

The example in FIG. 10B differs from the example of defect in FIG. 10A in that there is no time variation in duty ratio of the development AC clock signal Po1 at all since the frequency of serial conversion timing is set to be an integral multiple of the frequency of the development AC clock signal. Therefore, jitter due to above described parallel-to-serial conversion by the parallel-to-serial conversion circuit 205 does not occur in a signal corresponding to the development AC clock signal, thus an image density unevenness due to jitter can be prevented. The use of serial communication can reduce the number of signal lines while maintaining the image quality, thus cost reduction and space saving can be realized.

To reliably obtain the above described effect, it is desirable to operate the circuit for generating the development AC clock signal and the circuit for performing parallel-to-serial conversion by using the same reference clock, like the present exemplary embodiment. Although the present exemplary embodiment is described based on a case where the development AC clock generation circuit 202, the output port register 203, the motor clock generation circuit 204, and the parallel-to-serial conversion circuit 205 are included in the ASIC 208, these circuits may be configured by separate integrated circuits (ICs).

Although the first exemplary embodiment is described based on a case where an AC voltage is applied to the developing unit 4, the present invention is also applicable to a case where an AC voltage is applied to the charging roller 2 as a second exemplary embodiment. In the second exemplary embodiment, a charging voltage composed of a DC voltage (for example, a predetermined DC voltage −300 to −900 VDC) and a sine wave AC voltage (a predetermined AC voltage 1300 to 2000 VAC) superimposed thereon is applied to the charging roller 2. Except for an AC charging configuration, an image forming apparatus according to the second exemplary embodiment is configured in a similar way to the image forming apparatus in the first exemplary embodiment.

Figure 11:
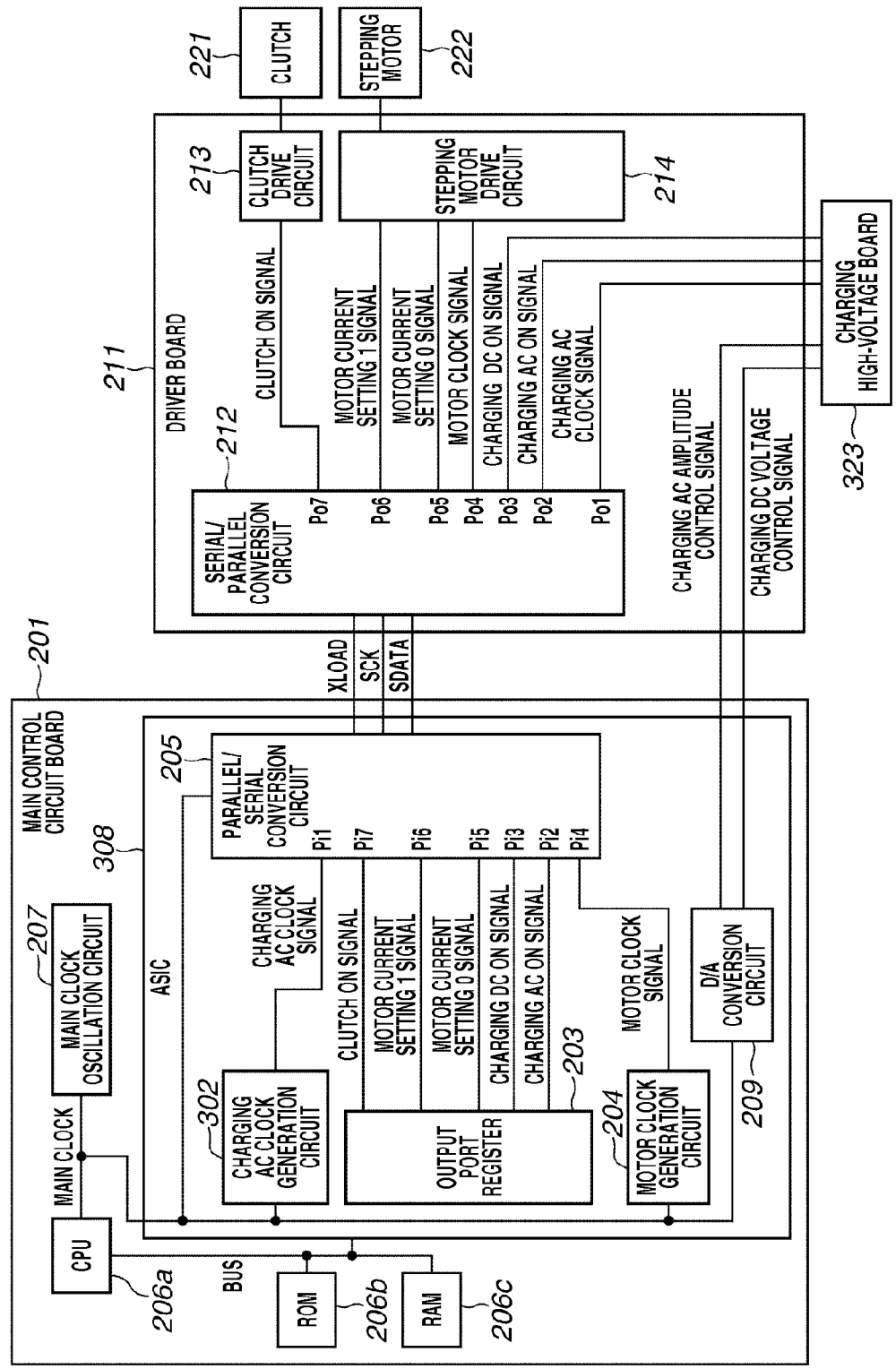
FIG. 11 is a block diagram of a main control circuit board and a driver board according to a second exemplary embodiment.
Figure 12:
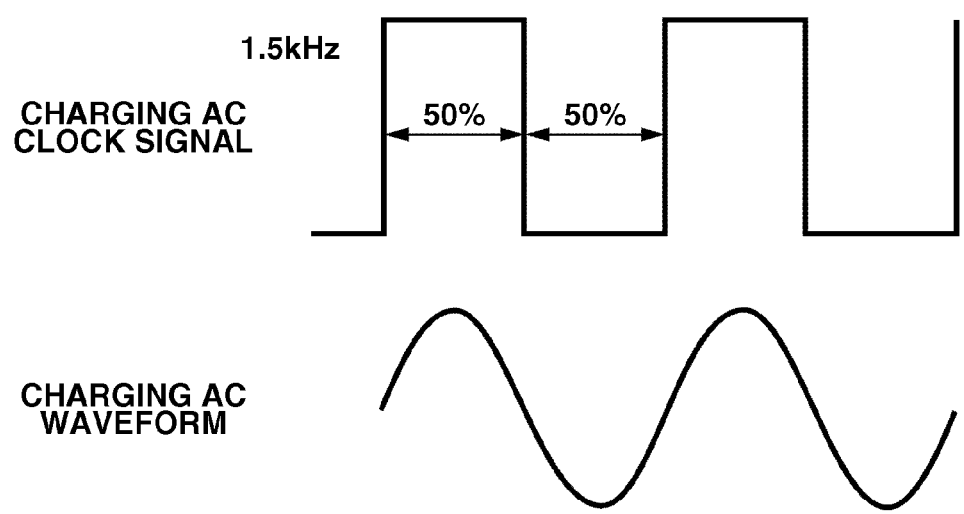
FIG. 12 illustrates a charging AC clock signal.

FIG. 11 is a block diagram of the main control circuit board 201 of the image forming apparatus 100 and the driver board 211 of the image forming unit 50. The configuration in FIG. 11 differs from the configuration in FIG. 2 in that an ASIC 308 on the main control circuit board 201 has a charging AC clock generation circuit 302 and a charging high-voltage board 323 is connected to the driver board 211. Further, the development-related signals in the first exemplary embodiment are replaced by charging-related signals in the second exemplary embodiment. The charging AC clock generation circuit 302 generates a charging AC clock signal (a waveform signal for charging devices) which is a rectangular wave clock signal as illustrated in FIG. 12 and has a frequency of 1.5 kHz and a duty ratio having 50% high-level width and 50% low-level width.

FIG. 13 is a circuit diagram of the charging high-voltage board 323. A D/A conversion circuit 206 arranged on the main control circuit board 201 generates a charging AC amplitude control signal and a charging DC voltage control signal. The generated charging AC amplitude control signal and charging DC voltage control signal are input into the charging high-voltage board 323. An output port register 303 generates a charging AC ON signal and a charging DC ON signal. The charging AC ON signal and the charging DC ON signal are input into the charging high-voltage board 323 via the parallel-to-serial conversion circuit 205 and the serial-to-parallel conversion circuit 212. The charging AC clock generation circuit 302 generates the charging AC clock signal. The generated charging AC clock signal is input into the charging high-voltage board 323 via the parallel-to-serial conversion circuit 205 and the serial-to-parallel circuit 212.

The charging high-voltage board 323 includes a charging DC high-voltage circuit 331 and a charging AC high-voltage circuit 332. To the charging DC high-voltage circuit 331, the charging DC ON signal for turning ON its output and the charging DC voltage control signal for setting up its output voltage are input. The charging AC high-voltage circuit 332 includes a charging AC amplitude control circuit 334, a low-pass filter 337, and an amplifier circuit 336.

During a period in which the charging AC ON signal is ON, the charging AC amplitude control circuit 334 supplies a voltage corresponding to the charging AC amplitude control signal to a source of an field effect transistor (FET). The charging AC clock signal is input to a gate of the FET. Thus, a rectangular wave having the frequency of the charging AC clock signal is generated at a contact between the charging AC amplitude control circuit 334 and the FET. The low-pass filter 337 converts this rectangular wave into a sine wave. An output current of the low-pass filter 337 is amplified by the amplifier circuit 336 and then supplied to the charging roller 2 via a charging AC transformer 335.

In the present exemplary embodiment, the frequency of serial conversion timing of the parallel-to-serial conversion circuit 205 is set to be an integral multiple of the frequency of the charging AC clock signal. In the present exemplary embodiment, the frequency of the charging AC clock signal is 1.5 kHz and the frequency of serial conversion timing is 60 kHz. Therefore, similar to the first exemplary embodiment, jitter due to above described parallel-to-serial conversion by the parallel-to-serial conversion circuit 205 does not occur in a signal corresponding to the charging AC clock signal, thus an image density unevenness due to jitter can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-052021 filed Mar. 9, 2010, which is hereby incorporated by reference herein in its entirety.

What is claimed is:

1. An image forming apparatus comprising:
a photosensitive member;
an exposure unit configured to expose the photosensitive member in accordance with an image signal;
a developing unit configured to develop, using a toner, an electrostatic latent image formed on the photosensitive member exposed by the exposure unit;
a voltage applying unit configured to apply to the developing unit a voltage;
a main clock generation unit configured to generate a main clock signal;
an alternating-current voltage control signal generation unit configured to generate an alternating-current voltage control signal representing a period and a duty ratio of an alternating-current voltage based on the main clock signal;
a parallel-to-serial conversion unit configured to sample the alternating-current voltage control signal and other control signals input in parallel in synchronization with a sampling signal generated according to the main clock signal, to convert the sampled alternating-current control signal and the sampled other control signals into serial signals, and to output the serial signals and the sampling signal; and
a serial-parallel conversion unit configured to convert the serial signals into parallel signals in synchronization with the sampling signal and to output the sampled alternating-current voltage control signal and the sample control signals in parallel, wherein the voltage applying unit uses an alternating-current voltage having a period and a duty ratio represented by the sampled alternating-current voltage control signal output by the serial-to-parallel conversion unit, and wherein a frequency of the sampling signal is an integral multiple of a frequency of the alternating-current voltage control signal generated by the alternating-current voltage control signal generation unit.

2. An image forming apparatus including the communication apparatus according to claim 1, the image forming apparatus comprising a charging unit configured to charge the photosensitive member.

3. The image forming apparatus according to claim 1, wherein the other control signals include a voltage ON signal.

4. The image forming apparatus according to claim 1, further comprising a motor drive unit configured to drive a stepping motor, wherein the other control signals include a motor current setting signal or a motor clock signal and the waveform signal which are input to the motor drive unit, and wherein the motor drive unit supplies to the stepping motor a current or a clock according to the signal corresponding to the motor current setting signal or the motor clock signal.

5. The image forming apparatus according to claim 1, further comprising a clutch drive unit configured to drive a clutch, wherein the other control signals include a clutch ON signal and the waveform signal which are input to the clutch drive unit, and wherein the clutch drive unit turns ON the clutch responsive to the signal corresponding to the clutch ON signal.

6. The image forming apparatus according to claim 1, wherein the parallel-to-serial conversion unit transmits the serial signals and the sampling signal to the serial-to-parallel conversion unit via different signal lines.

* * * * *